US00RE43813E

(19) United States
(12) Reissued Patent
Mochizuki

(10) Patent Number: US RE43,813 E
(45) Date of Reissued Patent: Nov. 20, 2012

(54) IMAGE PROCESSING APPARATUS AND METHOD, PROGRAM, AND STORAGE MEDIUM

(75) Inventor: Yasushi Mochizuki, Kanagawa (JP)

(73) Assignee: Canon Kabushiki Kaisha, Tokyo (JP)

(21) Appl. No.: 13/217,162

(22) Filed: Aug. 24, 2011

Related U.S. Patent Documents

Reissue of:
(64) Patent No.: 7,580,575
Issued: Aug. 25, 2009
Appl. No.: 10/931,641
Filed: Aug. 31, 2004

(30) Foreign Application Priority Data

Sep. 3, 2003 (JP) ..... 2003-311449

(51) Int. Cl.
*G06K 9/00* (2006.01)

(52) U.S. Cl. ..... 382/187; 715/708; 715/808; 715/817; 715/863

(58) Field of Classification Search ..... 382/187; 715/708, 808, 817, 863
See application file for complete search history.

(56) References Cited

U.S. PATENT DOCUMENTS

| | | | | | |
|---|---|---|---|---|---|
| 5,194,949 | A * | 3/1993 | Poulsen et al. | 382/128 |
| 5,272,767 | A * | 12/1993 | Asmuth et al. | 382/305 |
| 5,559,942 | A * | 9/1996 | Gough et al. | 715/802 |
| 5,682,439 | A * | 10/1997 | Beernink et al. | 382/187 |
| 5,778,404 | A * | 7/1998 | Capps et al. | 715/234 |
| 5,805,167 | A * | 9/1998 | van Cruyningen | 715/808 |
| 5,977,948 | A * | 11/1999 | Nishibori | 715/841 |
| 6,510,453 | B1 * | 1/2003 | Apfel et al. | 709/206 |
| 6,714,214 | B1 * | 3/2004 | DeMello et al. | 715/711 |
| 6,801,190 | B1 * | 10/2004 | Robinson et al. | 345/173 |
| 6,836,759 | B1 * | 12/2004 | Williamson et al. | 704/235 |
| 7,259,752 | B1 * | 8/2007 | Simmons | 345/173 |
| 7,580,575 | B2 * | 8/2009 | Mochizuki | 382/187 |
| 7,739,612 | B2 * | 6/2010 | Wan et al. | 715/763 |
| 2003/0179201 | A1 * | 9/2003 | Thacker | 345/441 |
| 2004/0021647 | A1 * | 2/2004 | Iwema et al. | 345/179 |
| 2004/0070573 | A1 * | 4/2004 | Graham | 345/179 |
| 2004/0135824 | A1 * | 7/2004 | Fitzmaurice | 345/856 |
| 2004/0205514 | A1 * | 10/2004 | Sommerer et al. | 715/501.1 |
| 2005/0050463 | A1 * | 3/2005 | Mochizuki | 715/517 |
| 2006/0069603 | A1 * | 3/2006 | Williams et al. | 705/9 |

FOREIGN PATENT DOCUMENTS

| | | | |
|---|---|---|---|
| JP | 04-222063 | A | 8/1992 |
| JP | 10-334092 | A | 12/1998 |
| JP | 2001-034744 | A | 2/2001 |
| JP | 2002-073240 | A | 3/2002 |
| JP | 2003-186620 | A | 7/2003 |

* cited by examiner

*Primary Examiner* — John Strege
(74) *Attorney, Agent, or Firm* — Canon USA, Inc., I.P. Division

(57) ABSTRACT

An image processing apparatus includes an image reader for reading an image. A display controller displays the read image on a display device. A determination unit receives an area specified by an operation performed on the image displayed on the display device so as to determine a processing area to be subjected to predetermined image processing. A setting unit sets an operation area for providing an instruction to execute the predetermined image processing on the processing area determined by the determination unit, the operation area being based on an end point of the area specified by the operation.

47 Claims, 6 Drawing Sheets

IMAGE PROCESSING APPARATUS AND METHOD, PROGRAM, AND STORAGE MEDIUM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image processing apparatus and method for editing and correcting image data. The invention also relates to a program implementing the above-described method and a storage medium storing such a program therein.

2. Description of the Related Art

Hitherto, to perform image processing, such as trimming or color correction, the following procedure has been taken. After specifying a rectangular area, to be subjected to image processing, from the top left to the bottom right, as shown in FIG. 7A, with a pointing device, for example, a mouse, the type of image processing is determined by selecting a button or a menu disposed at the corner of the window on a user interface (hereinafter referred to as a "UI"). Then, an "OK button" or a "correction start button" is pressed to perform correction processing (see Japanese Patent Laid-Open No. 2001-034744). Alternatively, in a system without a "correction start button", as shown in FIG. 7B, the mouse is dragged to specify a rectangular area and is then dropped to set the area and also to perform correction at the same time.

In the first method, however, the end point of the rectangular area can be far away from the "correction start button", in which case, the user has to move the pointing device a long distance. Also, if there are plural similar buttons or small image buttons arranged at the corner of the UI, it is difficult to distinguish the "correction start button" from the other buttons.

In the second method, if the user is unfamiliar with the operation of the pointing device, he/she may not drop the mouse at a desired place and may fail to correctly specify the rectangular area, in which case, correction is conducted based on the wrongly specified area.

SUMMARY OF THE INVENTION

Further objects, features and advantages of the present invention will become apparent from the following description of the preferred embodiments with reference to the attached drawings.

The present invention provides an image processing apparatus including: an image reader for reading an image; a display controller for displaying the read image on a display device; a determination unit for receiving an area specified by an operation performed on the image displayed on the display device so as to determine a processing area to be subjected to predetermined image processing; and a setting unit for setting an operation area for providing an instruction to execute the predetermined image processing on the processing area determined by the determination unit, the operation area being based on an end point of the area specified by the operation.

The present invention also provides an image processing method including: an image reading step of reading an image; a display control step of displaying the read image on a display device; a determination step of receiving an area specified by an operation performed on the image displayed on the display device so as to determine a processing area to be subjected to predetermined image processing; and a setting step of setting an operation area for providing an instruction to execute the predetermined image processing on the processing area determined by the determination step, the operation area being based on an end point of the area specified by the operation.

The present invention further provides a program having modules for allowing a computer to read the modules and to control a predetermined image processing method. The modules include: an image reading module for allowing a computer to read an image; a display control module for displaying the read image on a display device; a determination module for receiving an area specified by an operation performed on the image displayed on the display device so as to determine a processing area to be subjected to predetermined image processing; and a setting module for setting an operation area for providing an instruction to execute the predetermined image processing on the processing area determined by the determination module, the operation area being based on an end point of the area specified by the operation.

The present invention also provides a storage medium storing a program for allowing a computer to execute the above-described image processing method.

According to the present invention, in a system for specifying an area, for example, a rectangular area, and executing image processing on the specified area, an instruction can be given to perform image processing, such as correction, without the need to move a pointing device a long distance from the end point of the specified area. Additionally, the user can check the specified area before starting correction, and as a result, correction is not conducted based on the wrongly specified area.

DESCRIPTION OF THE PREFERRED EMBODIMENTS

The present invention is described in detail below with reference to the accompanying drawings through illustration of embodiments.

First Embodiment

Figure 2:
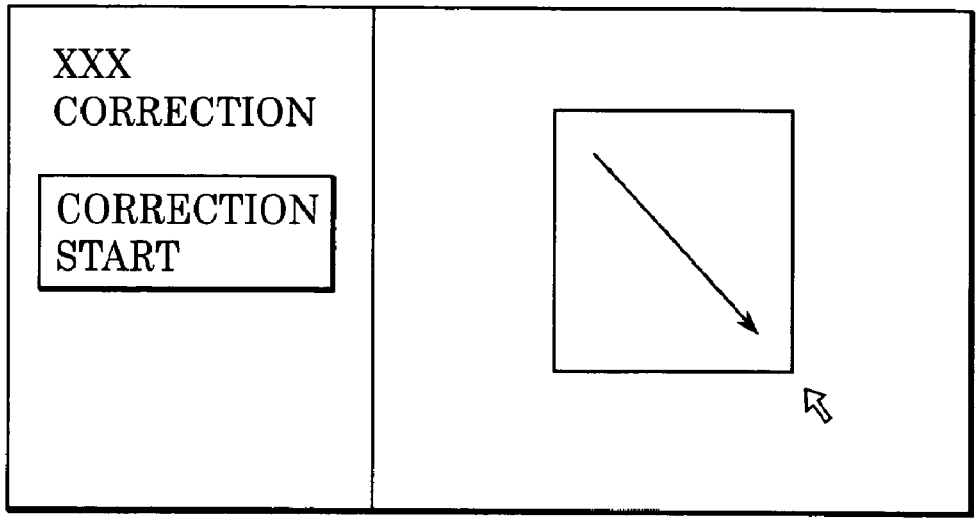
FIG. 2 illustrates a display example when a rectangular area is specified from the top left to the bottom right and when the end point of the specified area is clicked.

An overview of a first embodiment is as follows. After specifying a rectangular area from the top left to the bottom right, as shown in FIG. 2, by using, for example, a mouse, the coordinates of the bottom right corner (end point) where the mouse is dropped are stored. Thereafter, when the same coordinates (or adjacent coordinates) are specified again, image processing, such as color correction, is performed. Accordingly, after checking the rectangular area, the user can perform image processing simply by clicking the mouse one more times almost without moving the mouse. Even if the user fails to specify a rectangular area, he/she can retry before executing image processing.

Figure 3A:
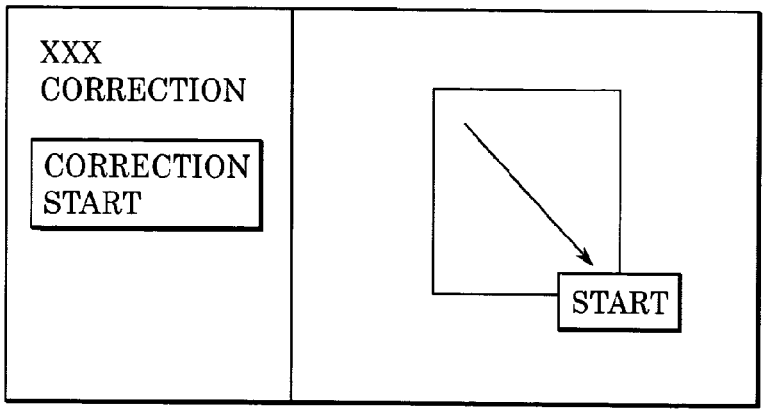
FIG. 3A illustrates a display example when a rectangular area is specified from the top left to the bottom right in an embodiment.

If a button is displayed, as shown in FIGS. 3A through 3D, in an area containing the end point of the previously stored specified rectangular area, the operability can be enhanced in terms of the visibility. For example, after specifying a rectangular area, as shown in FIG. 3A, from the top left to the bottom right with a mouse, a "correction start" button is displayed at the bottom right corner (end point) where the mouse is dropped. This enables the user to perform image processing, such as correction, simply by clicking the mouse one more times without moving the mouse a long distance. Additionally, it is sufficient to display a button for specifying an area: it would otherwise be difficult to distinguish such a button from other buttons unrelated to image processing.

Figure 3B:
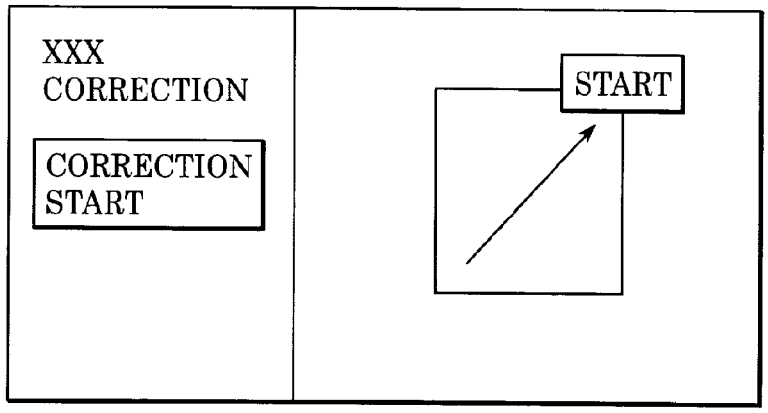
FIG. 3B illustrates a display example when a rectangular area is specified from the bottom left to the top right in an embodiment.

When a rectangular area is specified, as shown in FIG. 3B, by moving the mouse from the bottom left to the top right, the "correction start button" is displayed at the top right.

Figure 3C:
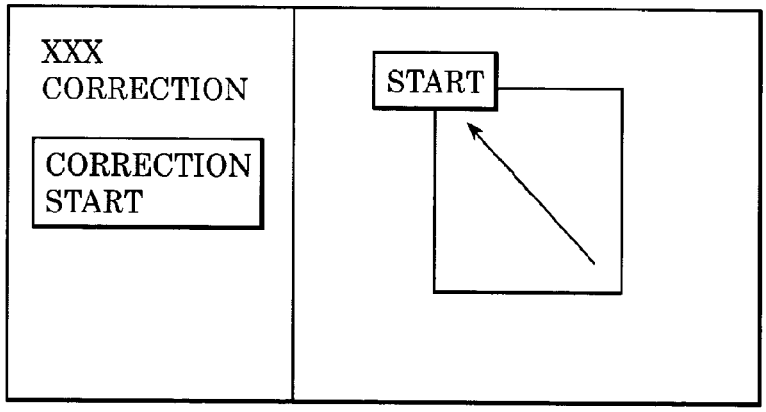
FIG. 3C illustrates a display example when a rectangular area is specified from the bottom right to the top left in an embodiment.

When a rectangular area is specified, as shown in FIG. 3C, by moving the mouse from the bottom right to the top left, the "correction start button" is displayed at the top left.

Figure 3D:
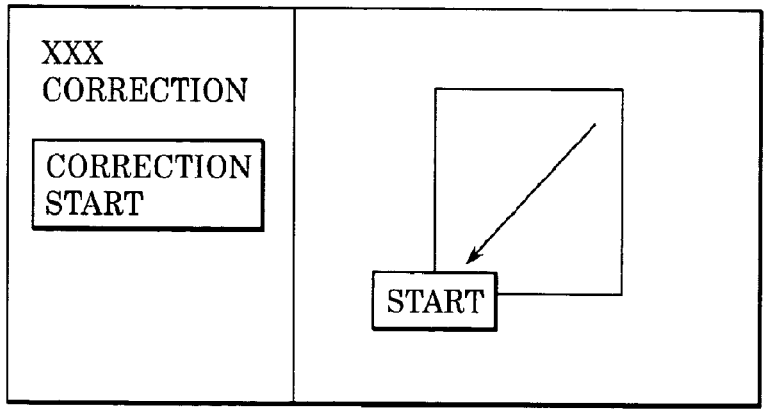
FIG. 3D illustrates a display example when a rectangular area is specified from the top right to the bottom left in an embodiment.

When a rectangular area is specified, as shown in FIG. 3D, by moving the mouse from the top right to the bottom left, the "correction start button" is displayed at the bottom left.

Figure 4:
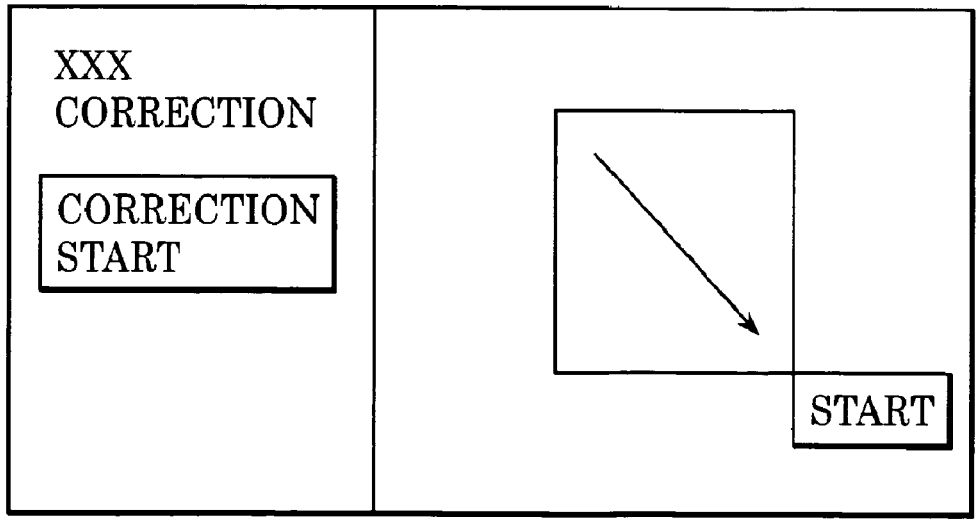
FIG. 4 illustrates a display example when a correction start button is displayed near the end point of a specified rectangular area.

When the "correction start button" is overlapped with the rectangular area, it may be difficult to see the state in the rectangular area. In this case, the "correction start button" may be displayed, as shown in FIG. 4, near the end point and outside the rectangular area. The position of the button may contain the end point of the specified area, or may simply be near the end point.

In this embodiment, the end point indicates an area (or point) in an image when the area is specified and set by the user. The configuration of the area to be specified is not restricted to rectangular.

Figure 1:
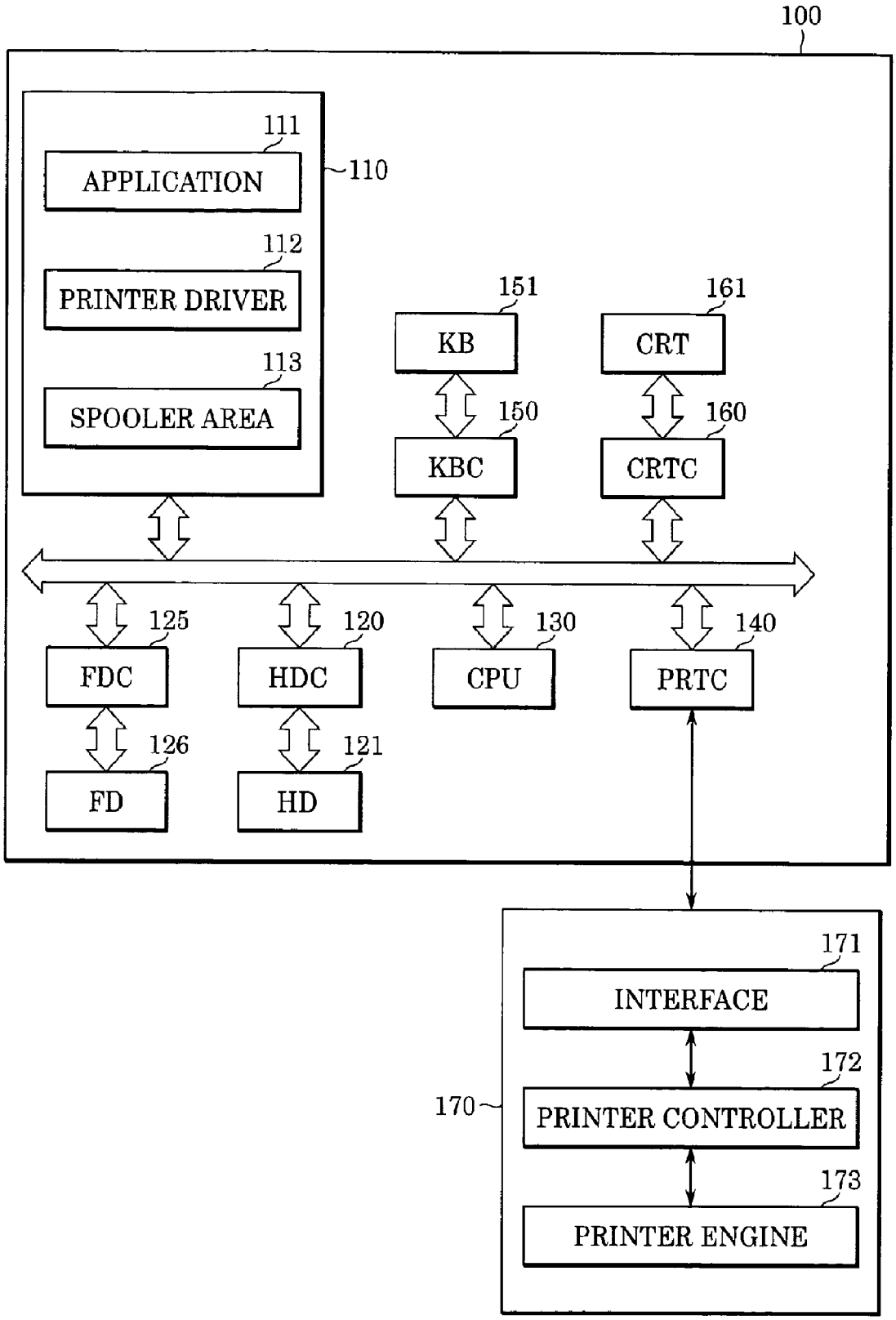
FIG. 1 is a block diagram illustrating an image forming system according to an embodiment of the present invention.

FIG. 1 is a block diagram illustrating the configuration of an image forming system to which an image editing apparatus of the first embodiment can be applied.

The image forming system in the first embodiment includes, as shown in FIG. 1, an image processing apparatus 100 for generating print data (containing control commands, which apply to print data in the following description) and a printer 170 for forming images based on the print data.

The information processing apparatus 100 includes a memory 110, a central processing unit (CPU) 130, a hard disk controller (HDC) 120, a hard disk (HD) 121, a floppy disk controller (FDC) 125, a floppy disk drive (FD) 126, a printer controller (PRTC) 140, a keyboard controller (KBC) 150, a keyboard (KB) 151, a cathode ray tube controller (CRTC) 160, and a CRT 161.

The memory 110 contains an application 111, which is loaded from the HD 121, for performing image editing processing of the present invention; a printer driver 112, which is software for generating print data corresponding to the printer 170; a spooler area 113 for spooling print data to be supplied to the printer 170; an operating system (OS) (not shown); a work area (not shown), etc.

The CPU 130 is operated based on the application 111, the printer driver 112, and the OS in the memory 110. When power is supplied, the information processing apparatus 100 is booted from a ROM (not shown) and is loaded from the HD 121 to the memory 110, and then, the information processing apparatus 100 functions as the image forming system. The CPU 130 can access the HD 121 via the HDC 120.

The PRTC 140 sequentially sends print data stored in the spooler area 113 to the printer 170. The KBC 150 controls the KB 151 to input instruction data from the user into the image processing apparatus 100. The CRTC 161 controls the CRT 161, which is a display device. The blocks of the KBC 150, the KB 151, the CRTC 160, and the CRT 161 form a UI, and another block, for example, a pointing device, may be added.

The printer 170 includes an interface 171 for receiving print data from the information processing apparatus 100 and for reporting various statuses to the information processing apparatus 100, a printer controller 172 for interpreting received printer data so as to generate bitmap image data, and a printer engine 173 for receiving the bitmap image data from the printer controller 172 so as to generate images. The printer 170 is also provided with other elements, for example, an operation panel (not shown).

In the image forming system configured as described above, when connecting the printer 170 to the image processing apparatus 100 for the first time, a printer driver for generating printer data corresponding to the printer 170 must be installed. Generally, the installation operation of the printer driver is performed only once.

Figure 5:
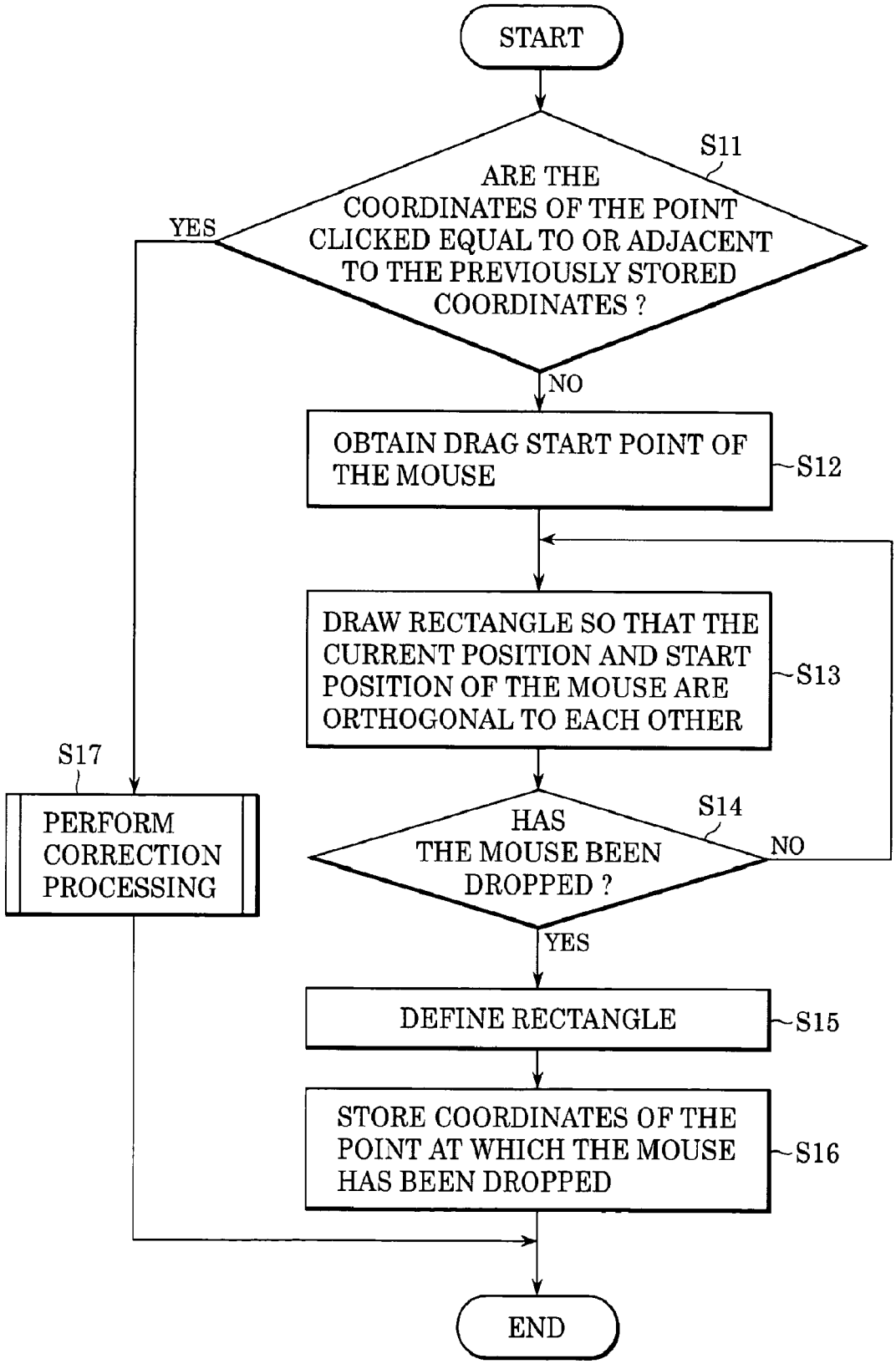
FIG. 5 is a flowchart illustrating a rectangular-area specifying process in an image editing method according to an embodiment.

FIG. 5 is a flowchart illustrating an example of a rectangular-area specifying process in an image editing method of the present invention. This process starts when the user starts specifying a rectangular area for the read image data by using a pointing device, such as a mouse.

It is assumed that this process is executed based on a program stored in the HD 121 and loaded into the memory 110 by the CPU 130.

The user first determines the type of image processing and then starts dragging the mouse from a certain position in the image to specify an area to be subjected to image processing. Then, the process shown in FIG. 5 starts.

In this embodiment, an area is specified by dragging the mouse and then by dropping it. However, the start point and the end point may be specified with a touch pad, or a center point and a radius may be specified to determine a circular area.

Although the image processing is described below in the context of image correction, any type of image processing, for example, trimming, rotation, or image inversion, may be conducted.

In this embodiment, the end point indicates the area in an image specified and set by the user.

In step S11, it is determined whether a correction start button, which is described below, has been clicked. If the point clicked is not the button, it is determined that the user is to specify a new rectangular area. Then, in step S12, the point at which the user has started to drag the mouse is obtained.

In step S13, a rectangle is drawn so that the current position and the start position of the mouse are diagonal to each other. The rectangle may be a square.

It is then determined in step S14 whether the mouse has been dropped. If not, step S13 is repeated. When the mouse is dropped, the current position of the mouse becomes the end point, and the rectangle is defined in step S15. In step S16, the coordinates of the end point are stored, and the process is completed.

When the user clicks the mouse again, the process shown in FIG. 5 is restarted. It is determined in step S11 whether the coordinates of the point clicked by the user are equal to or adjacent to the coordinates of the previously stored end point. If the outcome of step S11 is YES, the process proceeds to step S17 in which correction processing is executed. The process is then completed.

Although the correction processing in step S17 is performed based on the specified rectangle, an area outside the specified rectangle may also be corrected. For example, when smoothing correction is performed on a specified image of a face to produce beautiful skin, a rectangular area is selected mainly from the face. In actual correction, however, it is more natural and effective when performing smoothing correction not only on the face, but also on the neck and the chest linked to the face. In this manner, when a rectangular area is selected mainly from the face, it is preferable that the area subjected to correction is automatically modified to the optimal area according to the type of correction.

There is no strict definition for points adjacent to the end point. However, the adjacent points can be defined such that, when they are specified, correction processing is started in a manner similar to when the end point is specified.

Second Embodiment

In the first embodiment, the end point of the specified rectangular area is clicked one more times to start correction processing. If a button is displayed in an area containing the end point, the operability can be enhanced in terms of the visibility.

Figure 6:
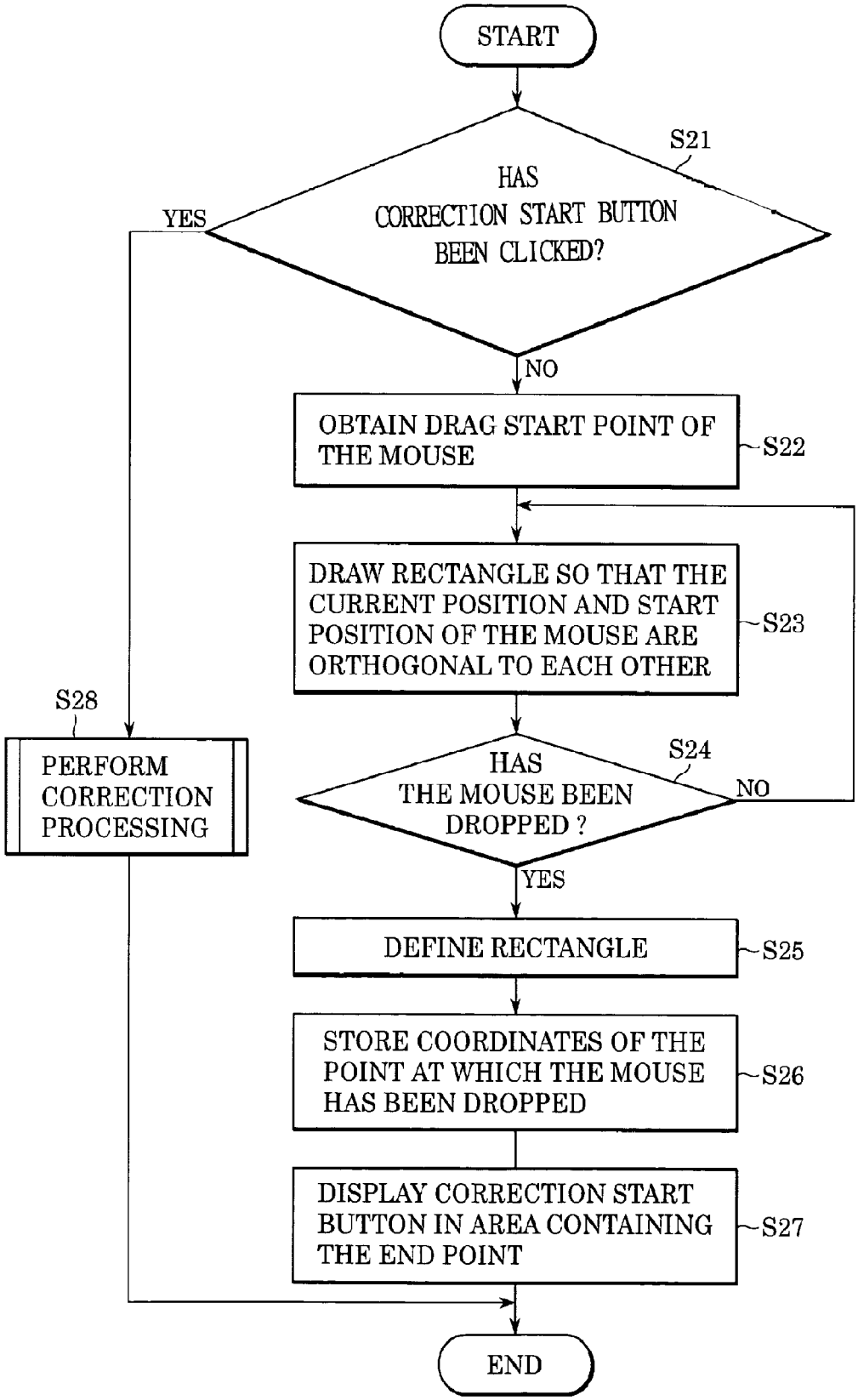
FIG. 6 is a flowchart illustrating another rectangular-area specifying process in an image editing method according to an embodiment.
Figure 7A:
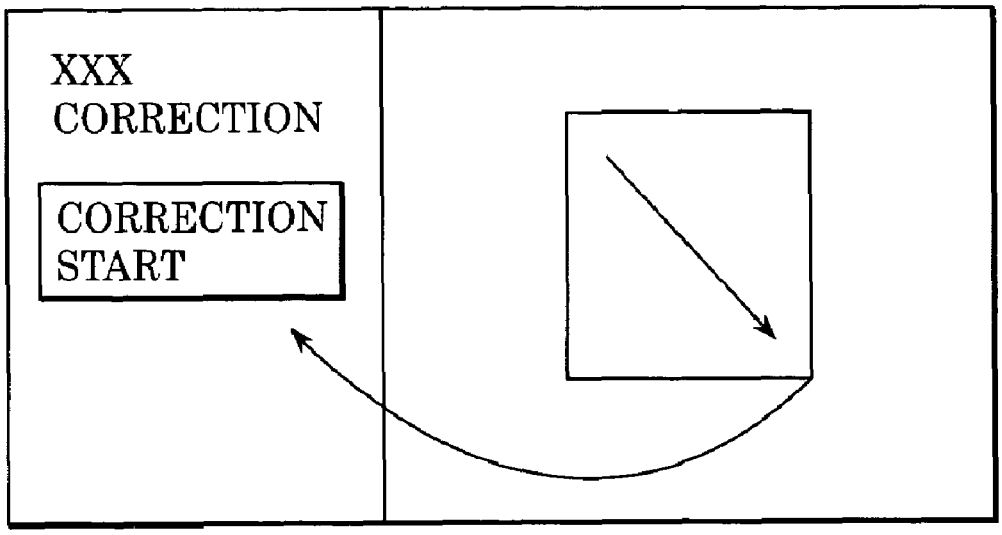
FIG. 7A PRIOR ART
FIG. 7A illustrates a rectangular area specified with a correction start button in the related art.
Figure 7B:
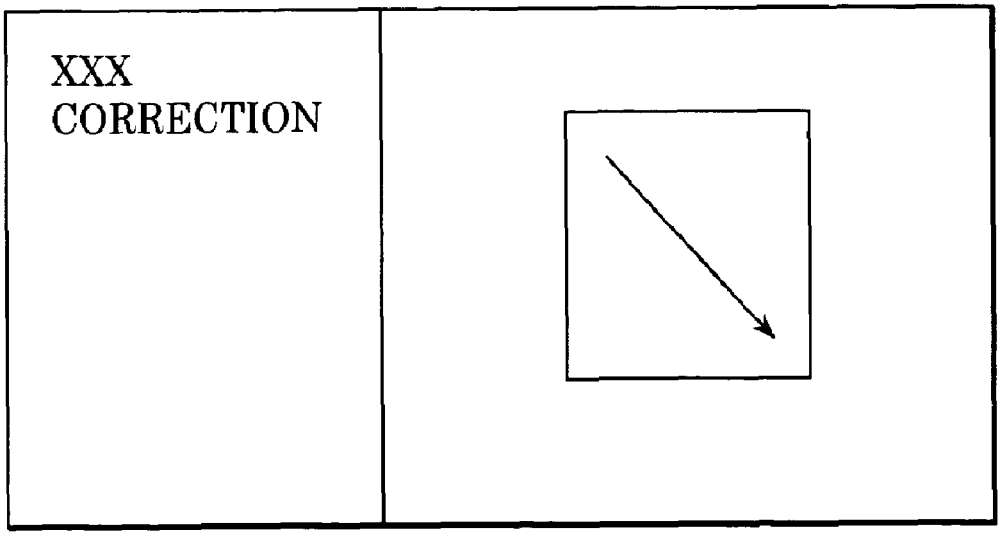
FIG. 7B PRIOR ART
FIG. 7B illustrates a rectangular area specified without a correction start button in the related art.

FIG. 6 is a flowchart illustrating a rectangular-area specifying process when a correction start button is displayed. The user first determines the type of image processing to be performed, and then starts dragging the mouse at a certain point in the image to specify an area to be subjected to image processing. Then, this process starts.

In step S21, it is determined whether the correction start button has been clicked, and if the point clicked by the user is not the button, it is determined that the user is to specify a new rectangular area. Then, in step S22, the point at which the user has started dragging the mouse is obtained.

In step S23, a rectangle is drawn so that the current position and the start position of the mouse are diagonal to each other. The rectangle may be a square.

It is then determined in step S24 whether the mouse has been dropped. If not, step S23 is repeated. When the mouse is dropped, the current position of the mouse becomes the end point, and the rectangle is defined in step S25. In step S26, the coordinates of the end point are stored.

Then, in step S27, a "correction start button" for providing an instruction to start correction, such as that shown in FIG. 3A, is displayed in the area containing the previously stored coordinates, and the process is then completed.

FIGS. 3B through 3D are display examples of the correction start button when the mouse is dragged in the corresponding directions, as discussed in the first embodiment.

FIG. 4 illustrates a display example of the correction start button when the mouse is dragged at the top left point and dropped at the bottom right point. As discussed in the first embodiment, the correction start button may be displayed, as shown in FIG. 4, near the end point so that the entire area can be seen clearly.

When the end point is positioned at an edge (for example, the bottom edge or the corner) of the image, or at an edge of the display area, the correction start button may be disposed somewhere else, for example, near the start point of the specified area. With this modification, the ease of operation can further be enhanced. This can be implemented by the function of the application 111 for allowing a computer to execute the above-described embodiments. All the functions of the above-described embodiments may be executed by hardware.

Whether the user drags the mouse again, the process shown in FIG. 6 is restarted. If it is found in step S21 that the correction start button has been clicked, the correction processing is performed in step S28, and then, the process is completed.

As in the first embodiment, although the correction processing in step S28 is performed based on the specified rectangle, an area outside the specified rectangular may also be corrected.

Modifications

The present invention can be achieved by providing a storage medium in which software program codes implementing the functions of the above-described embodiments to the system or the apparatus and by allowing a computer (or a CPU or an MPU) of the system or the apparatus to read and execute the program codes. In this case, the program codes read from the storage medium or modules for executing the predetermined functions in the program implement the functions of the embodiments. Thus, a storage medium storing such program codes constitutes the present invention. As the storage medium used for supplying such program codes, a floppy disk, a hard disk, an optical disc, a magneto-optical disk, a compact disc read only memory (CD-ROM), a CD-recordable (CD-R), magnetic tape. a non-volatile memory card, or a ROM, can be used.

As stated above, the computer can execute the program codes read from the storage medium to implement the functions of the above-described embodiments. Additionally, in the present invention, an OS running in the computer may partially or wholly execute the processing based on the instructions of the program codes to implement the functions of the above-described embodiments.

The program codes read from the storage medium may be written into a memory provided for a feature expansion board inserted into the computer or a feature expansion unit connected to the computer. Then, the CPU provided for the feature expansion board or the feature expansion unit may partially or wholly execute the processing based on the instructions of the program codes to implement the functions of the foregoing embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-311449 filed Sep. 3, 2003, which is hereby incorporated by reference herein.

What is claimed is:

1. An image processing apparatus comprising:

[an image reading unit adapted to read an image;]

a display control unit adapted to display [the read] *an* image on a display device;

an area-specifying operation unit adapted to perform an area-specifying operation to specify an area for the image displayed on the displayed device by using an area having a starting point and an end point, the starting point and the end point being located at respective ends of a diagonal line specified by the area-specifying operation;

a determination unit adapted to determine a processing area to process the image by an area-specifying operation performed by the area-specifying operation unit; and a setting unit adapted to set, within a display area of the display unit, an operation area for providing an instruction to execute predetermined image processing on the processing area determined by the determination unit, the operation area being set on a position based on the end point specified by the area-specifying operation performed by the area-specifying operation unit.

2. The image processing apparatus according to claim 1, wherein the operation area is substantially the same point as the end point.

3. The image processing apparatus according to claim 1, wherein the operation area is a button display area containing the end point.

4. The image processing apparatus according to claim 1, wherein the operation area is adjacent to the end point and does not contain the area specified by the area-specifying operation.

5. The image processing apparatus according to claim 1, further comprising a displacing unit adapted to displace the operation area to a position based on a start point of the area-specifying operation when it is difficult to set the operation area because the end point of the area-specifying operation by the area-specifying operation unit is located near an edge of the image or an edge of a display area of the display device.

6. The image processing apparatus according to claim 1, further comprising a processing-type specifying unit adapted to specify the type of image processing before receiving the area-specifying operation.

7. The image processing apparatus according to claim 1, wherein the display control unit controls the display device to display thereon the operation area set by the setting unit.

8. An image processing method comprising:

[reading an image;]

displaying [the read] *an* image on a display device;

performing an area-specifying operation for specifying an area for the image displayed on the displayed device by using an area having a starting point and an end point, the starting point and the end point being located at respective ends of a diagonal line specified by the area-specifying operation;

determining a processing area to process the image based on the area-specifying operation; and setting, within a display area of the display device, an operation area for providing an instruction to execute predetermined image processing on the processing area determined by the determination step, the operation area being set on a position based on the end point specified by the area-specifying operation.

9. The image processing method according to claim 8, wherein the operation area is substantially the same point as the end point.

10. The image processing method according to claim 8, wherein the operation area is a button display area containing the end point.

11. The image processing method according to claim 8, wherein the operation area is adjacent to the end point and does not contain the area specified by the area-specifying operation.

12. The image processing method according to claim 8, further comprising displacing the operation area to a position based on a start point of the area-specifying operation when it is difficult to set the operation area because the end point of the operation is located near an edge of the image or an edge of a display area of the display device.

13. The image processing method according to claim 8, further comprising specifying the type of image processing before receiving the area-specifying operation.

14. The image processing method according to claim 8, wherein the display control step controls the display device to display thereon the operation area set by the setting step.

15. A *non-transitory* computer-readable storage medium storing a program for allowing a computer to execute steps of:

[reading an image;]

displaying [the read] *an* image on a display device;

performing an area-specifying operation for specifying an area for the image displayed on the displayed device by using an area having a starting point and an end point, the starting point and the end point being located at respective ends of a diagonal line specified by the area-specifying operation;

determining, by receiving an area-specifying operation to be performed on the image displayed on the display device, a processing area to process the image by an area-specifying operation; and setting, within a display area of the display device, an operation area for providing an instruction to execute predetermined image processing on the processing area determined by the determination step, the operation area being set on a position based on the end point specified by the area-specifying operation.

16. An image processing apparatus comprising:

a processing-type specifying unit adapted to specify a type of image processing;

[an image reading unit adapted to read an image;]

a display control unit adapted to display [the read] *an* image on a display device;

an area-specifying operation unit adapted to perform an area-specifying operation to specify an area for the image displayed on the displayed device by using an area having a starting point and an end point, the starting point and the end point being located at respective ends of a diagonal line specified by the area-specifying operation;

a determination unit adapted to determine a processing area to process the image by an area-specifying operation performed by the area-specifying operation unit; and a setting unit adapted to set, within a display area of the display device, an operation area for providing an instruction to execute image processing specified by the processing-type specifying unit on the processing area determined by the determination unit, the operation area being set on a position containing the end point specified by the area-specifying operation performed by the area-specifying operation unit, wherein the display control unit controls displaying the operation area set by the setting unit on the display device as a button.

17. An image processing method comprising:

specifying a type of image processing;

[reading an image;]

displaying [the read] *an* image on a display device;

performing an area-specifying operation for specifying an area for the image displayed on the displayed device by using an area having a starting point and an end point, the starting point and the end point being located at respective ends of a diagonal line specified by the area-specifying operation;

determining a processing area to process the image by an area-specifying operation; and setting, within a display area of the display device, an operation area for providing an instruction to execute specified image processing on the determined processing area, the operation area being set on a position containing the end point specified by the area-specifying operation, wherein the operation area set is displayed on the display device as a button.

18. A *non-transitory* computer-readable storage medium storing a program for allowing a computer to execute steps of:

specifying a type of image processing;

[reading an image;]

displaying [the read] *an* image on a display device;

performing an area-specifying operation for specifying an area for the image displayed on the displayed device by using an area having a starting point and an end point, the starting point and the end point being located at respective ends of a diagonal line specified by the area-specifying operation; determining a processing area to process the image by an area-specifying operation; and setting, within a display area of the display device, an operation area for providing an instruction to execute specified image processing on the determined processing area, the operation area being set on a position containing the end point specified by the area-specifying operation, wherein the operation area set is displayed on the display device as a button.

*19. An editing apparatus comprising:*

*a display control unit configured to cause a display device to display information for editing;*

*a specifying unit configured to specify a processing portion for editing the information in accordance with a user's operation;*

*a determining unit configured to determine an end point based on the user's operation for specifying the processing portion;*

*a setting unit configured to set an instruction portion, on the information displayed on the display device by the display control unit, for providing an instruction to execute editing on the specified processing portion in the information, the instruction portion being set on a position based on the end point determined by the determining unit; and*

*an editing unit configured to execute the editing on the specified processing portion in the information in accordance with a user's operation of the instruction portion set by the setting unit.*

*20. The editing apparatus according to claim 19, wherein the setting unit sets the instruction portion on the end point determined by the determining unit.*

*21. The editing apparatus according to claim 19, wherein the setting unit stores coordinates of the end point for setting the instruction portion.*

*22. The editing apparatus according to claim 19, wherein the setting unit sets the instruction portion near the end point determined by the determining unit.*

*23. The editing apparatus according to claim 19, wherein the specifying unit cancels the processing portion which has been specified in a case where a portion different from the instruction portion is operated by a user.*

*24. The editing apparatus according to claim 19, wherein the specifying unit is configured to initialize the specifying operation so as to be able to specify a new processing portion in a case where a portion different from the instruction portion is operated by a user.*

*25. The editing apparatus according to claim 19, wherein the specifying unit specifies the processing portion in accordance with a user's operation by using a pointing device.*

*26. The editing apparatus according to claim 19, wherein the specifying unit specifies the processing portion in accordance with a start point and the end point based on a user's operation.*

*27. The editing apparatus according to claim 19, wherein the processing portion is a rectangular area.*

*28. The editing apparatus according to claim 27, wherein the rectangular area has a diagonal line based on the start point and the end point.*

*29. The editing apparatus according to claim 19, wherein the editing unit corrects the information.*

*30. The editing apparatus according to claim 19, wherein the editing unit modifies the information.*

*31. The editing apparatus according to claim 19, wherein the editing unit executes the editing according to an editing method which is designated before the specifying unit specifies the processing portion.*

*32. The editing apparatus according to claim 19, wherein the information is an image.*

*33. An editing method comprising:*

*causing a display device to display information for editing;*

*specifying a processing portion for editing the information in accordance with a user's operation;*

*determining an end point based on the user's operation for specifying the processing portion;*

*setting an instruction portion, on the information displayed on the display device, for providing an instruction to execute editing on the specified processing portion in the information, the instruction portion being set on a position based on the determined end point; and*

*executing the editing on the specified processing portion in the information in accordance with a user's operation of the set instruction portion.*

*34. A non-transitory computer-readable storage medium storing a computer-executable program, the program comprising:*

*causing a display device to display information for editing;*

*specifying a processing portion for editing the information in accordance with a user's operation;*

*determining an end point based on the user's operation for specifying the processing portion;*

*setting an instruction portion, on the information displayed on the display device, for providing an instruction to execute editing on the specified processing portion in the information, the instruction portion being set on a position based on the determined end point; and*

*executing the editing on the specified processing portion in the information in accordance with a user's operation of the set instruction portion.*

*35. A processing apparatus comprising:*

*a specifying unit configured to specify a processing portion, defined by a start point and an end point related to movement of a pointing device, in displayed information for executing a process; and*

*a setting unit configured to set an operation position to be operated by a user for executing the process, the operation position being set on a position based on the end point.*

*36. The processing apparatus according to claim 35, wherein the displayed information comprises an image.*

*37. The processing apparatus according to claim 35, wherein the processing portion comprises a rectangular area.*

*38. The processing apparatus according to claim 35, wherein the processing portion comprises a circular area.*

*39. The processing apparatus according to claim 35, wherein the process comprises image processing.*

*40. The processing apparatus according to claim 35, wherein the setting unit store positional information of the end point for setting the operation position.*

*41. The processing apparatus according to claim 35, wherein the setting unit is configured to set the operation position for providing an instruction to execute the process.*

*42. The processing apparatus according to claim 41, wherein the instruction is displayed at the operation position.*

*43. The processing apparatus according to claim 35, wherein the position is on or adjacent to the end point.*

*44. The processing apparatus according to claim 41, wherein the instruction is displayed near the end point.*

*45. The processing apparatus according to claim 41, wherein the instruction is displayed near the start point.*

*46. A processing method comprising:*

*specifying a processing portion, defined by a start point and an end point related to movement of a pointing device, in displayed information for executing a process; and*

*setting an operation position to be operated by a user for executing the process, the operation position being set on a position based on the end point.*

*47. A non-transitory computer-readable storage medium storing a computer-executable program, the program comprising:*

*specifying a processing portion, defined by a start point and an end point related to movement of a pointing device, in displayed information for executing a process; and*

*setting an operation position to be operated by a user for executing the process, the operation position being set on a position based on the end point.*

* * * * *